US008746066B2

(12) United States Patent
Classen et al.

(10) Patent No.: US 8,746,066 B2
(45) Date of Patent: Jun. 10, 2014

(54) ACCELERATION SENSOR HAVING A DAMPING DEVICE

(75) Inventors: Johannes Classen, Reutlingen (DE); Sebastian Guenther, Tuebingen (DE); Harald Steffes, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 351 days.

(21) Appl. No.: 13/195,510

(22) Filed: Aug. 1, 2011

(65) Prior Publication Data

US 2012/0031185 A1    Feb. 9, 2012

(30) Foreign Application Priority Data

Aug. 9, 2010 (DE) .......................... 10 2010 039 069

(51) Int. Cl.
*G01P 15/08* (2006.01)

(52) U.S. Cl.
USPC ..................................... 73/514.13; 73/514.32

(58) Field of Classification Search
USPC ............... 73/514.13, 514.14, 514.32, 514.36, 73/514.38

See application file for complete search history.

(56) References Cited

U.S. PATENT DOCUMENTS

| 5,447,068 | A | * | 9/1995 | Tang .......................... 73/514.32 |
| 6,272,926 | B1 | * | 8/2001 | Fehrenbach et al. ........ 73/514.32 |
| 2009/0266164 | A1 | * | 10/2009 | Furukubo et al. .......... 73/514.32 |
| 2010/0024552 | A1 | * | 2/2010 | Foster ........................ 73/514.29 |

* cited by examiner

*Primary Examiner* — John Chapman, Jr.
(74) *Attorney, Agent, or Firm* — Kenyon & Kenyon LLP (57) ABSTRACT

A micromechanical acceleration sensor is described which includes a substrate and a seismic mass which is movably situated with respect to the substrate in a detection direction. The micromechanical sensor includes at least one damping device for damping motions of the seismic mass perpendicular to the detection direction.

11 Claims, 6 Drawing Sheets

Specifically, for rocker-like acceleration sensors, susceptibility to interference due to accelerations perpendicular to torsional axis (104) may be greatly reduced with the aid of such a damping device.

BRIEF DESCRIPTION OF THE DRAWINGS

The present invention is described in greater detail below with reference to the figures.

DETAILED DESCRIPTION OF EXAMPLE EMBODIMENTS

Figure 1:
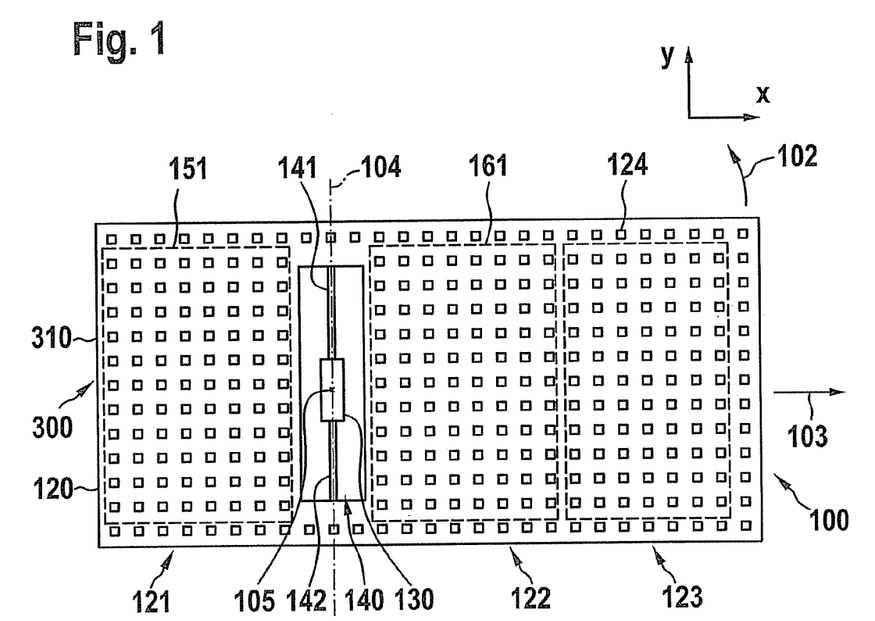
FIG. 1 shows a top view of a sensor structure designed as a rocker-like z acceleration sensor.
Figure 2:
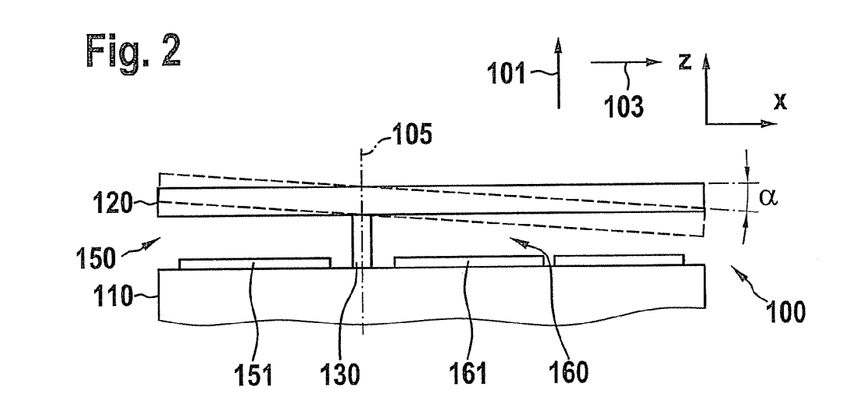
FIG. 2 shows a schematic side view of the rocker-like z acceleration sensor from FIG. 1.

FIGS. 1 and 2 show a typical z acceleration sensor having the so-called "rocker design." Micromechanical sensor 100 illustrated in a top view in FIG. 1 is composed of a plate-shaped body 120 which is used as a seismic mass and which is deflectably suspended in a rocker-like manner with respect to a subjacent substrate 110 with the aid of an elastic suspension 140. Seismic mass 120 may be connected, for example, via two torsion springs 141, 142 to a central support structure 130 which is used as a suspension point for torsion springs 141, 142. The suspension of seismic mass 120 is selected in such a way that an additional mass 123 results on a rocker side 122 which causes a torque, and therefore a deflection α of rocker 120 from its neutral/zero position, when the sensor structure is accelerated perpendicular to the substrate plane. In the present example, the motion of rocker 120 is capacitively evaluated with the aid of two detection electrodes 151, 161, situated on either side of support structure 130, each of which, together with seismic mass 120 as a shared counter electrode, forms a separate detection electrode system 150, 160, respectively.

As indicated by the dashed line in FIG. 2, which shows a side view of rocker-like acceleration sensor 100 from FIG. 1, a deflection of seismic mass 120 to the left by an angle a results in an increase in the distance between left detection electrode 151 and mass electrode 120, while at the same time the distance between right detection electrode 161 and mass electrode 120 is decreased. The deflection of rocker 120 may be ascertained from the resulting capacitance difference between detection electrode systems 150, 160.

As indicated by arrows 102, 103 in FIG. 1, the use of elastic torsion springs 141, 142 also results in a deflection of the seismic mass within the x-y plane perpendicular to detection direction 101. In particular, a translational vibration of the seismic mass parallel to the x direction as well as a rotational vibration of the seismic mass about a rotational axis 105 which is parallel to the z direction are excited as spurious modes. A typical micromechanical sensor 100 is accommodated within a gas-filled cavern which protects the sensitive micromechanical components of the sensor from harmful environmental influences. The detection motion of the rocker in the z direction is strongly damped due to friction effects of seismic mass 120 with the gas molecules enclosed in the cavern. As a result of the strong damping, spurious vibrations above the low-frequency measuring range (approximately 10 Hz to 50 Hz) and having much higher frequencies than the −3 dB frequency result in few or no errors in the sensor signal. The damping in the z direction is dominated by channel friction and deflection flows at perforation holes 124 in rocker 120 which have been produced in the manufacturing process as a measure for simplified underetching at regular distance intervals in the plate-shaped rocker element 120. In contrast to the vibrational motion in the z direction, in the design illustrated here vibration modes of rocker 120 in the plane (so-called in-plane modes) are damped much more weakly, which allows rocker 120 to be easily set in vibration by appropriate spurious excitations. These spurious modes depend on various characteristics of sensor element 100, such as the functional layer thickness or the configuration of the torsion springs, for example. Depending on the particular application, these spurious modes may be very close to the frequency ranges of the target applications which have high spurious vibrations (for integrated ESP units, several kHz, for example). Since the in-plane modes have high quality, the spurious vibrations, in particular in combination with resonances of the sensor housing, may result in lateral striking of the rocker, and therefore impermissibly large spurious signals at the sensor output, even at low spurious excitations in the range of a few Gs.

For reducing the spurious in-plane vibrations, micromechanical sensor 100 is equipped with at least one damping device in which the damping effect is achieved by squeeze film damping. Longitudinal damping structures which are situated at a small distance opposite from one another and which preferably extend perpendicularly to the particular damping direction are used as damping devices. In each case, a first damping structure situated on rocker structure 120 and a second damping structure connected to substrate 110 form a damping gap which preferably extends orthogonally with respect to the particular damping direction. The gap thickness is determined by the distance between the two detection structures. This distance is preferably selected in such a way that a damping effect which is optimal for the particular application results. Squeeze film damping is a fluidic effect in which a fluid (in the present case, a gas) which is enclosed between two generally parallel surfaces absorbs a portion of the kinetic energy in the form of heat energy when the surfaces approach one another. The desired squeeze film damping develops in particular for gaps which have a lateral extension that is significantly greater than the distance between the oppositely situated surfaces.

Figure 3:
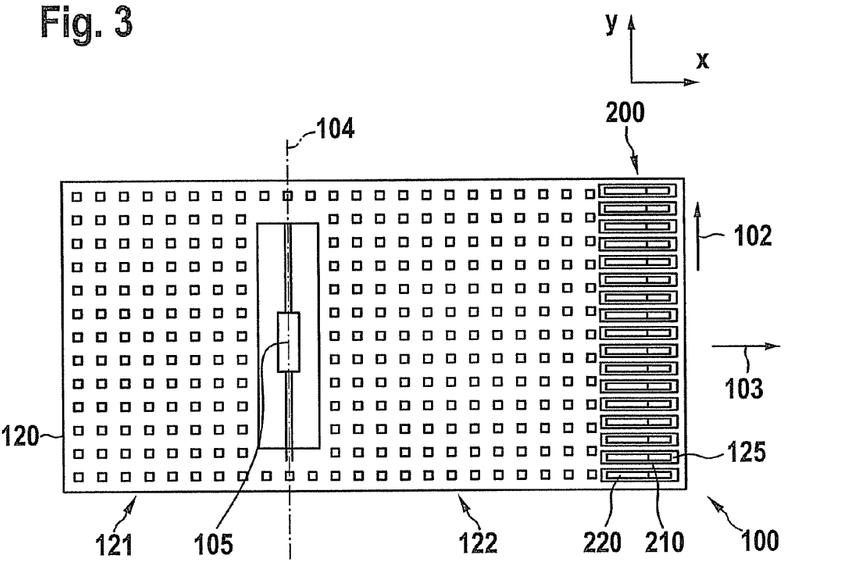
FIG. 3 shows a top view of a z acceleration sensor modified according to the present invention, having a damping device for damping rotational vibration.

FIG. 3 shows a top view of an acceleration sensor 100 modified according to the present invention, in which a damping device 200 for damping a rotary motion of rocker 120 about rotational axis 105 is provided. Damping device 200 is preferably situated in an edge region of long section 122 of seismic mass 120. Due to the large distance between damping device 200 and rotational axis 105, a high lever action results which in turn increases the effectiveness of damping device 200. Damping device 200 includes multiple damping structures 210 situated on the sensor side which are designed as webs extending transversely with respect to the first damping direction. Webs 210 are defined by slotted holes 125, extending parallel to one another, which are provided in the outer edge region of rocker 120. Situated within the holes are complementary damping structures 220 which are fixedly connected to subjacent substrate 110.

Figure 4:
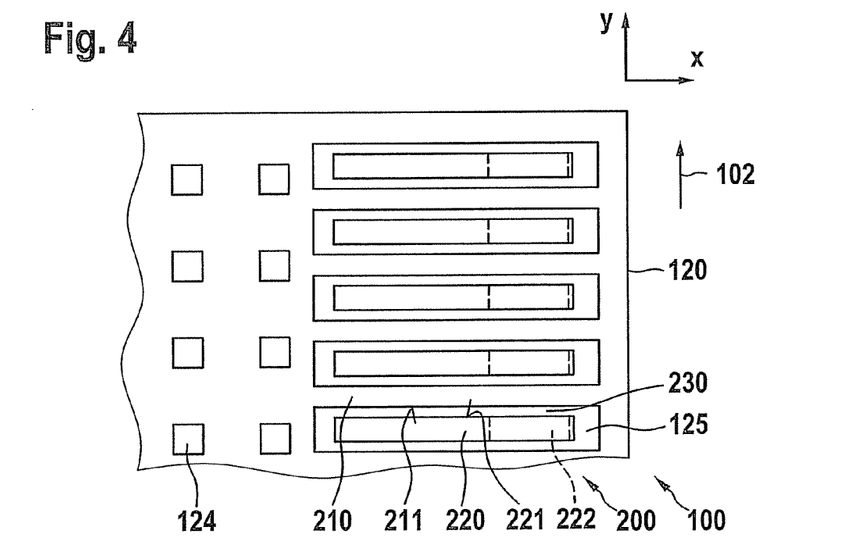
FIG. 4 shows a detailed view of the z acceleration sensor from FIG. 3.

For further clarification, FIG. 4 shows a detailed view of damping device 200. The illustrated detail corresponds to the upper right area of sensor device 100 shown in FIG. 1. For the sake of clarity, in each case only one of damping structures 210, 220 is provided with reference numerals. As shown in FIG. 4, damping structures 220 situated on the substrate side engage in the slot-like holes in rocker 120 without contacting damping elements 210, which have a weblike design. For this purpose, damping structures 220 on the substrate side may be formed from the same functional layer as rocker 120. The damping structures are preferably subsequently produced in a single structuring step together with the other structures of rocker 120, such as the perforation holes or the suspension of the rocker, for example. Damping structures 220 on the substrate side are mechanically coupled to subjacent substrate 110 via a base 222, which does not have to extend over the entire length of the particular damping structure. A gap 230 having a defined width is provided in each case between a bar-shaped damping structure 220 of the substrate and web-shaped damping structure 210 of rocker 120 which directly adjoins same. The gap width is determined by the width of individual structures 210, 220, which may vary depending on the application. The damping effect of this system is achieved according to the present invention with the aid of the squeeze film effect, a gas present in gap 230 being squeezed between surfaces 211, 221 of two adjacent damping structures 210, 220, in a direction parallel to the y direction, when rocker 120 moves. The compression of the gas enclosed in damping gap 230, similarly as for an air cushion, produces a force component which is directed opposite to the motion of rocker 120. At the same time, the compression also results in heating of the gas. Since a portion of the kinetic energy of rocker 120 is converted into heat energy, the process has a damping effect on rotary motion 102 of rocker 120.

Figure 5:
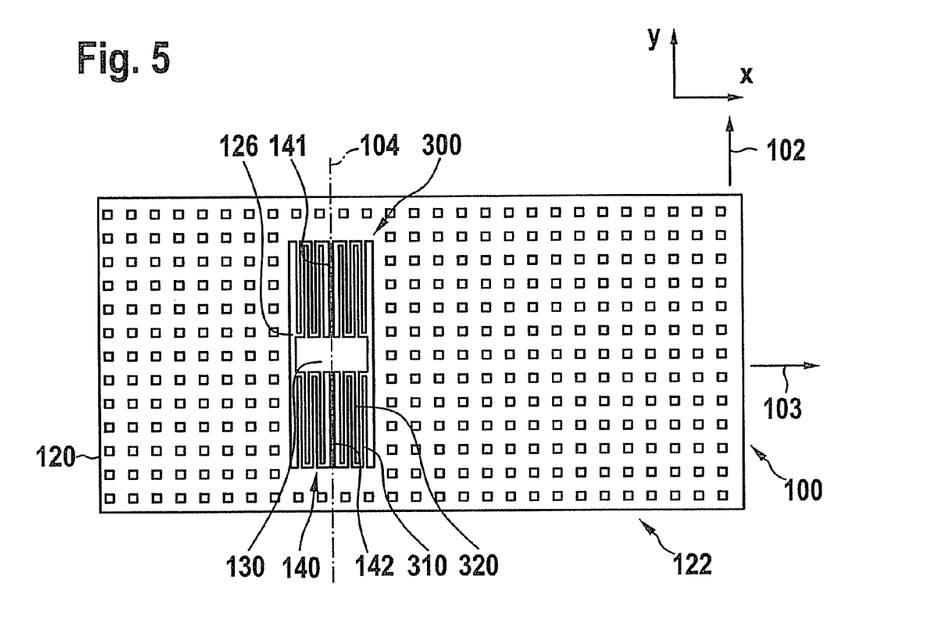
FIG. 5 shows a top view of a z acceleration sensor modified according to the present invention, having a damping device for damping translational vibration.

FIG. 5 shows a top view of a micromechanical sensor 100 having a damping device 300 for damping translational motions of rocker 120 in the x direction. In contrast to damping device 200 for the rotation mode shown in FIGS. 3 and 4, damping structures 310, 320 of damping device 300 now extend in the y direction. Since in principle no lever action is achievable for the translational motion, damping device 300, as in the present case, may be situated directly on the suspension of rocker 120. It is advantageous to connect stationary damping structures 220 to substrate 110 via base 130 of the suspension of rocker 120. For this purpose, base 130 as well as central opening 126 which accommodates the suspension may be correspondingly wider in the x direction. At the same time, the structure illustrated in FIG. 5 for damping the translational motion also causes damping of the rotary motion about rotational axis 105. Due to the lesser lever action, however, the damping is not quite as great as in FIG. 3.

Figure 6:
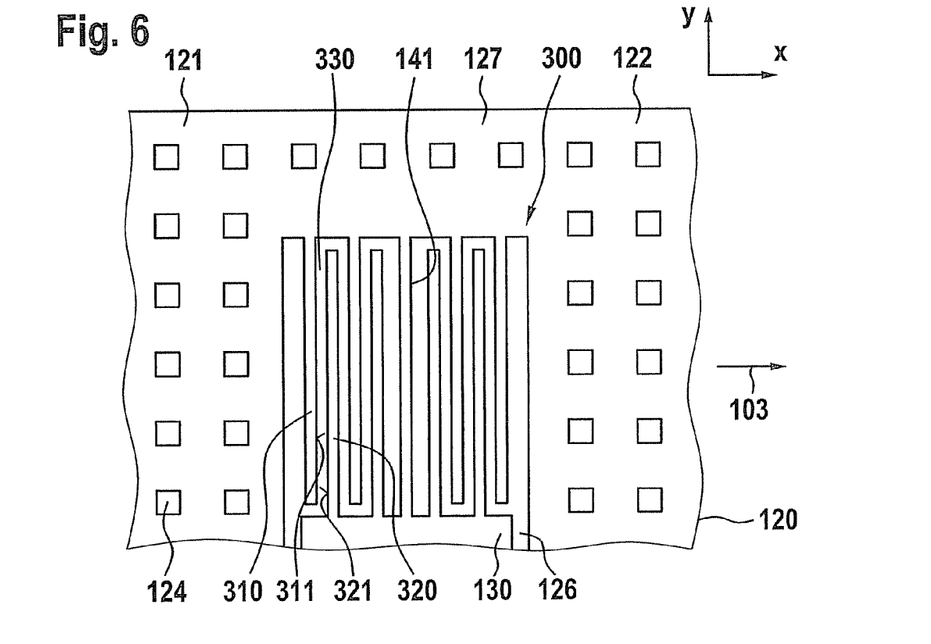
FIG. 6 shows a detailed view of the z acceleration sensor from FIG. 5.

FIG. 6 shows a detailed view of damping device 300 from FIG. 5. The upper section of damping device 300 is illustrated here. For the sake of clarity, in each case only one of damping structures 310, 320 is provided with reference numerals. As shown in FIG. 6, damping device 300 includes multiple damping structures which originate in a tine-like manner from connecting web 127 of the two rocker sections 121, 122, opposite the y direction. In addition, damping structures 320 complementary thereto are provided which originate in a tine-like manner from base 130, in the y direction. Damping structures 310, 320 intermesh in a comb-like manner, in each case resulting in a gap having a defined width between a damping structure 310 on the rocker side and a damping structure 320 on the substrate side, and which provides the damping. The damping effect of this system likewise results from the squeeze film effect, a gas present in gap 330 being squeezed between surface 311 of damping structure 310 on the rocker side and surface 321 of damping structure 320 on the substrate side during the motion of rocker 120 parallel to the x direction. Correspondingly, the gas in an adjacent gap of the damping structure system is squeezed when the rocker moves in the x direction. The damping effect of this system is a function, among other things, of the number and length of mutually complementary damping structures 310, 320. To achieve a sufficient damping effect, it is advantageous to provide multiple damping structure pairs next to one another in a comb-like manner. As shown in FIG. 5, damping structures 310, 320 may be situated on either side of spring structures 141, 142. Alternatively, the damping structures situated in a comb-like manner relative to one another may be situated on only one side of spring structures 141, 142. As shown in FIG. 5, damping structures 310, 320 beneath base 130 are situated symmetrically with respect to damping structures 310, 320 above base 130. This ensures that no torques which act on rocker 120 are generated by the damping effect of the damping structures.

Figure 7:
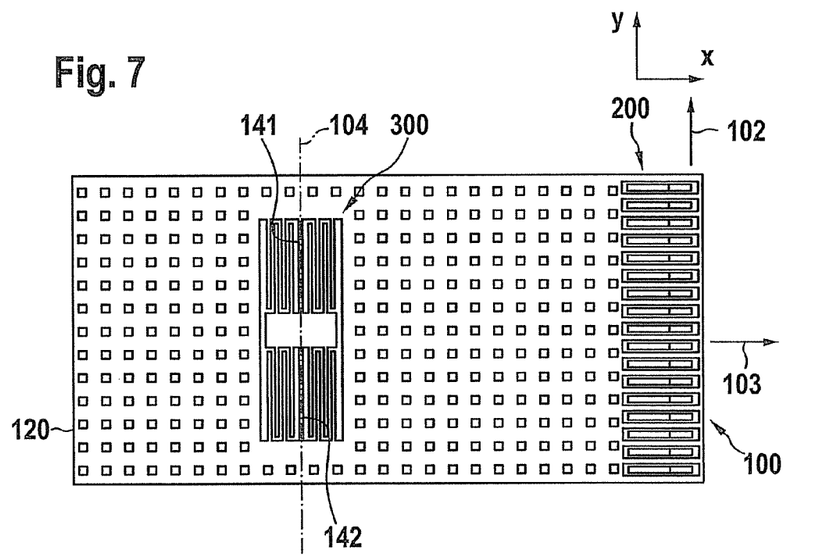
FIG. 7 shows an example z acceleration sensor according to the present invention, having a first damping device for damping the rotational vibration, and a second damping device for damping the translational vibration.

The damping device for the rotation mode shown in FIGS. 3 and 4 and the damping device for the translation mode shown in FIGS. 5 and 6 may also be implemented jointly in a micromechanical sensor 100. FIG. 7 shows a corresponding sensor 100 in which a first damping device 200 situated in the outer edge region of rocker 120 as well as a second damping device 300 situated in the region of the suspension are provided. Both damping devices 200, 300 have a design corresponding to the exemplary embodiments illustrated in the preceding figures.

Figure 8:
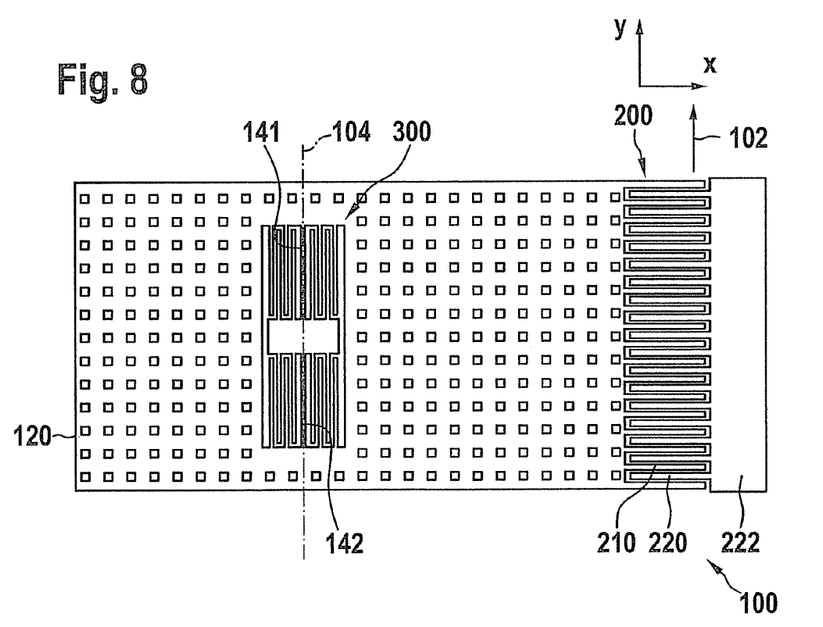
FIG. 8 shows an example z acceleration sensor according to the present invention, having a comb-shaped first damping device for damping the rotational vibration, and a second damping device for damping the translational vibration.

FIG. 8 shows an alternative variant of micromechanical sensor 100 designed according to the present invention. In contrast to the sensor shown in FIG. 7, first damping device 200 likewise has a comb-shaped design. For this purpose, the damping structures on the rocker side are designed as tines which originate from rocker 120 in the x direction and which are situated next to one another in a comb-like manner. Damping structures 220 on the substrate side which are complementary thereto likewise have a tine-like design and are situated in a comb-like manner. As shown in FIG. 8, in this system damping structures 220 may be attached to a shared base 222 situated outside damping device 200.

Figure 9:
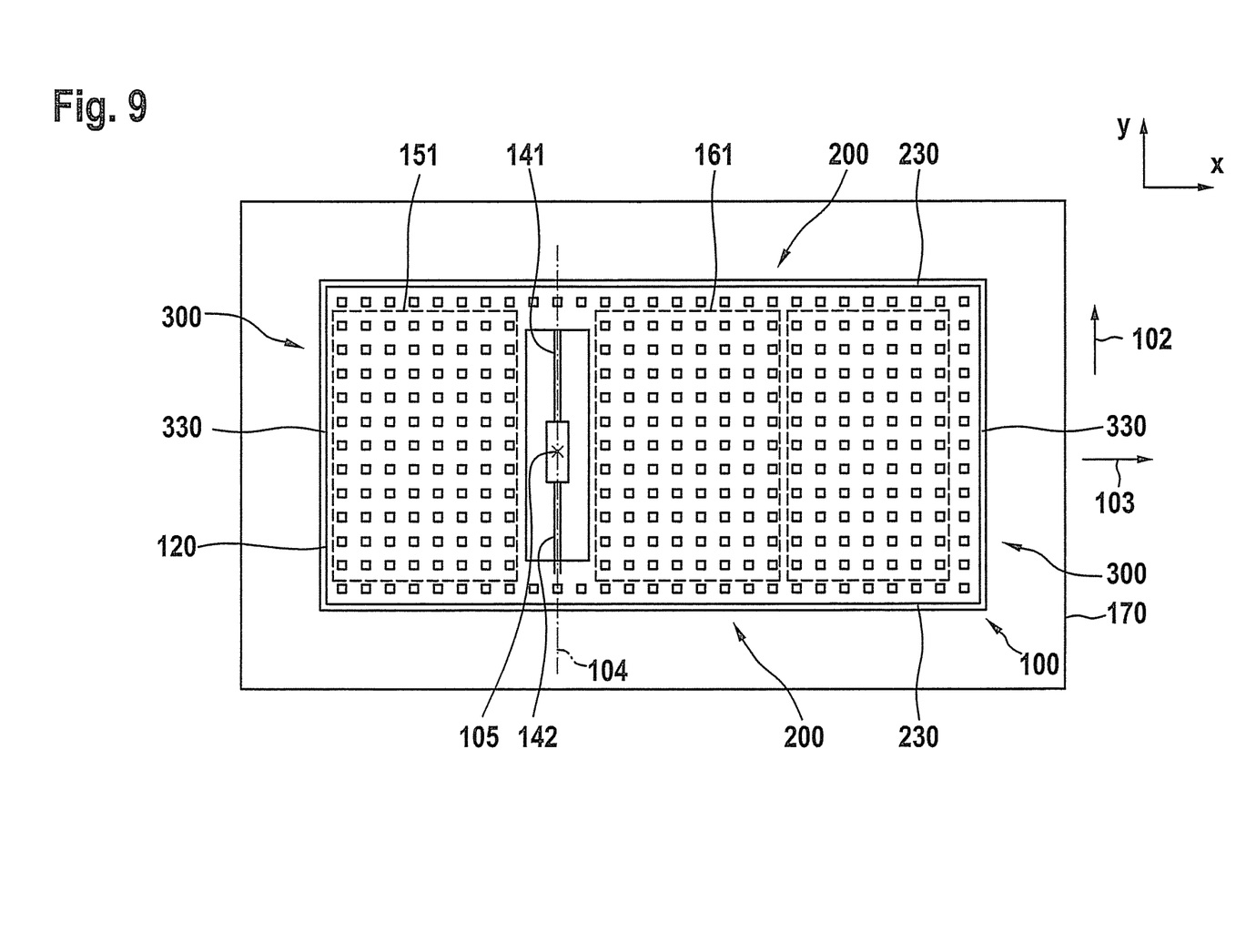
FIG. 9 shows a top view of an example z acceleration sensor according to the present invention, having a frame-shaped damping device for damping vibrations.
Figure 10:
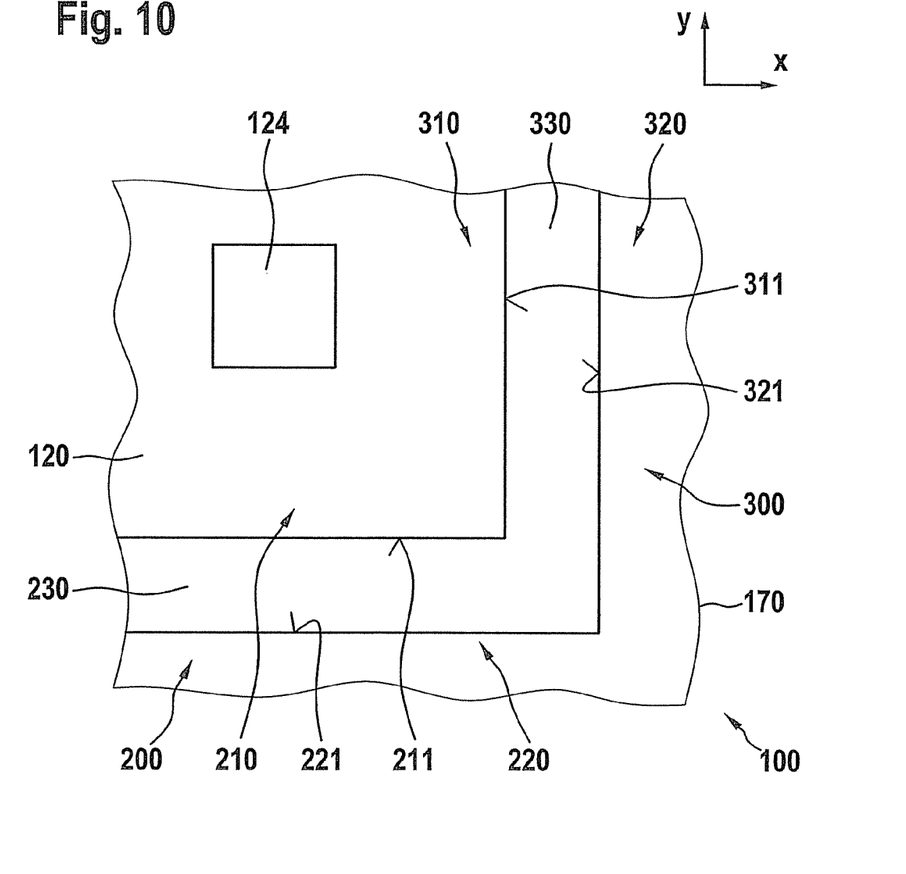
FIG. 10 shows a detailed view of the z acceleration sensor from FIG. 9.

An alternative variant of micromechanical sensor 100 according to the present invention is illustrated in FIG. 9. The damping effect is generated by a gap 230, 330 between rocker 120 and a structure 170 which at least partially encloses rocker 120. A first damping device 200 which damps the rotation mode of rocker 120 is formed from gap sections 230, which in FIG. 9 extend horizontally. On the other hand, a second damping device 300 which damps the translation mode of rocker 120 is formed from gap sections 330, which in the figure extend vertically. Frame structure 170 is preferably formed from the same functional layer as rocker 120. For a more detailed explanation of the mode of operation of this specific embodiment, a detailed view of the lower right section of the system shown in FIG. 9 is illustrated in FIG. 10. It is apparent from FIG. 10 that a horizontal edge section of rocker 120 which encloses surface 211 bordering horizontal gap section 230 is used as damping structure 210 of first damping device 200 on the substrate side, while damping structure 220 on the substrate side is formed from a horizontal edge section of frame structure 170 which is shaped corresponding to the contours of rocker 120 and which encloses surface 221 bordering horizontal gap section 230. Similarly, a damping structure 310 on the substrate side is formed by a vertical edge section of rocker 120 which encloses surface 311 bordering vertical gap section 330, while a damping structure 320 of second damping device 300 on the substrate side is formed by an edge section of frame structure 170 which follows the contour of section 310 and which encloses surface 321 bordering vertical gap section 330.

Frame structure 170 shown in FIG. 9 does not have to completely enclose rocker 120. Depending on the application, a frame structure which extends only partially over the periphery of rocker 120 may be provided.

To achieve an optimal damping effect of damping devices 200, 300 described here, mutually complementary damping structures 210 and 220 as well as 310 and 320 are preferably produced at a very small distance from one another. The width of the particular damping gap 230, 330 may be selected differently, depending on the application, in order to adjust the damping effect to the requirements of the particular application. To prevent spurious electrostatic effects, damping structures 210, 220; 310, 320 of damping devices 200, 300, respectively, are preferably connected to a shared electrical potential. This may be implemented, for example, with the aid of feedthroughs to buried electrodes in the region of the fixing points of the particular structures.

The specific embodiments described in the above description in conjunction with the figures are merely exemplary embodiments of the present invention. Depending on the application for implementing the present invention, all features described in this regard may be relevant alone as well as in combination with one another. Although the preceding description always refer to a rocker- or trampoline-shaped sensor as a spacer layer which is used as a sacrificial layer, the present invention is applicable to damping of undesirable motions of any suitable micromechanical component. In addition, the present invention is not to be construed as being limited only to the specific embodiments described herein. Rather, it is within the scope of the present invention to vary the number, the configuration, and the dimensions of the individual damping structures in order to achieve a damping effect of the damping devices which meets the requirements of the particular application.

What is claimed is:

1. A micromechanical sensor, comprising:
    a substrate;
    a seismic mass movably situated with respect to the substrate in a detection direction; and
    at least one damping device to damp motions of the seismic mass perpendicular to the detection direction;
    wherein the at least one damping device comprises web-shaped damping structures having slotted holes positioned on the seismic mass and bar-shaped damping structures connected to the substrate and situated within the slotted holes.

2. The micromechanical sensor as recited in claim 1, further comprising:
    a stationary damping structure mounted on the substrate, wherein the seismic mass includes at least one movable damping structure which, together with the stationary damping structure forms a gas-containing damping gap having a predefined width, the movable damping structure and the stationary damping structure being situated in relation to the detection direction in such a way that a width of the damping gap is reduced when the seismic mass moves perpendicular to the detection direction, causing squeezing of the gas in the damping gap.

3. The micromechanical sensor as recited in claim 1, wherein the damping device damps a rotary motion of the seismic mass about a rotational axis parallel to the detection direction.

4. The micromechanical sensor as recited in claim 3, wherein the damping device is situated in a region of the seismic mass that is remote from the rotational axis.

5. The micromechanical sensor as recited in claim 1, wherein the damping device damps a translational motion of the seismic mass perpendicular to the detection direction.

6. The micromechanical sensor as recited in claim 1, wherein the damping device includes multiple damping structures of the seismic mass and damping structures of the substrate being situated next to one another in an alternating sequence.

7. The micromechanical sensor as recited in claim 1, wherein the damping device includes multiple movable damping structures having a comb-shaped configuration which engage in stationary damping structures having a corresponding comb-shaped configuration.

8. The micromechanical sensor as recited in claim 1, wherein the seismic mass includes slotted openings between each of which a web-shaped movable damping structure extends, the stationary damping structures engaging in the slotted openings.

9. The micromechanical sensor as recited in claim 1, wherein a frame structure is provided which at least partially encloses the seismic mass, a damping gap being formed between an edge region of the seismic mass which is used as a stationary damping structure and an inner region of the frame-shaped damping structure which is used as a movable damping structure.

10. The micromechanical sensor as recited in claim 1, wherein the damping structure and the seismic mass are connected to a shared electrical potential.

11. The micromechanical sensor as recited in claim 1, wherein the micromechanical sensor is a rocker-like acceleration sensor.

* * * * *